United States Patent
Hsueh

(10) Patent No.: US 7,689,894 B2
(45) Date of Patent: Mar. 30, 2010

(54) DECODING APPARATUS AND METHOD THEREFOR

(75) Inventor: Ching-Wen Hsueh, Luodong Town, Yilan County (TW)

(73) Assignee: Mediatek Inc., Taiwan (CN)

( * ) Notice: Subject to any disclaimer, the term of this patent is extended or adjusted under 35 U.S.C. 154(b) by 993 days.

(21) Appl. No.: 11/433,210

(22) Filed: May 11, 2006

(65) Prior Publication Data

US 2007/0266299 A1    Nov. 15, 2007

(51) Int. Cl.
*H03M 13/00* (2006.01)
(52) U.S. Cl. .................. 714/785; 714/763
(58) Field of Classification Search .......... 714/785, 714/763
See application file for complete search history.

(56) References Cited

U.S. PATENT DOCUMENTS

| | | | | |
|---|---|---|---|---|
| 5,020,060 | A * | 5/1991 | Murai et al. | 714/784 |
| 5,926,490 | A * | 7/1999 | Reed et al. | 714/787 |
| 6,047,395 | A * | 4/2000 | Zook | 714/756 |
| 6,175,944 | B1 * | 1/2001 | Urbanke et al. | 714/776 |
| 6,445,733 | B1 * | 9/2002 | Zuranski et al. | 375/231 |
| 6,594,794 | B1 * | 7/2003 | De Marzi et al. | 714/784 |
| 6,621,982 | B1 * | 9/2003 | Kimura et al. | 386/116 |
| 6,732,325 | B1 * | 5/2004 | Tash et al. | 714/785 |
| 6,742,156 | B2 * | 5/2004 | Shieh | 714/756 |
| 6,757,861 | B1 * | 6/2004 | Dong | 714/761 |
| 6,832,042 | B1 * | 12/2004 | Shieh | 386/125 |
| 7,543,215 | B2 * | 6/2009 | Shieh et al. | 714/763 |
| 2002/0191967 | A1 | 12/2002 | Freissmann et al. | |
| 2003/0229841 | A1 * | 12/2003 | Kravtchenko | 714/784 |

FOREIGN PATENT DOCUMENTS

CN       1409856       4/2003

* cited by examiner

*Primary Examiner*—M. Mujtaba K Chaudry
(74) *Attorney, Agent, or Firm*—Ladas and Parry LLP

(57) ABSTRACT

A decoding apparatus adapted for an optical access system comprises an interface, a detection element, and an error correction element. The interface receives a data from an optical storage medium. The detection element executes an error detection on the data received from the interface before the data is buffered to a first memory and generates a defect result in response to the error detection. The error correction element decodes the data in response to the defect result. A decoding method for an optical access system comprising the steps of: receiving a data from an optical storage medium via an interface of the optical access system; executing an error detection on the data received from the interface before the data is buffered to a first memory; generating a defect result in response to the error detection; and decoding the data in response to the defect result.

19 Claims, 6 Drawing Sheets

DECODING APPARATUS AND METHOD THEREFOR

CROSS-REFERENCES TO RELATED APPLICATIONS

Not applicable.

BACKGROUND OF THE INVENTION

1. Field of the Invention

The present invention relates to a decoding apparatus adapted for an optical access system and a method therefor; more particularly, relates to a decoding apparatus and a decoding method for detecting and correcting errors in a data retrieved from an optical storage medium.

2. Descriptions of the Related Art

Since optical storage media have advantages of large capacity, low cost, high access speed, high compatibility, and portability, they become one of the most popular devices for storing data nowadays.

Due to the influence of scratches, fingerprints, collision, or dust, errors might occur when data stored in an optical storage medium is retrieved. Therefore, optical access systems of the prior art usually have a correction mechanism to correct the errors. FIG. 1 shows an optical access system of the prior art, and FIG. 2 shows a flow chart of a method of the prior art adapted for the optical access system to correct errors. The optical access system 1 comprises a pickup head 105, a buffer 107, a DRAM 109, a DRAM controller 111, a detection element 113, and an error correction element 115. The optical access system 1 retrieves data from an optical storage medium 101, such as a compact disc, and decodes the data before transmitting the data to a host 103 which is electrically connected to the optical access system 1. More particularly, referring to both FIG. 1 and FIG. 2, a pickup head 105 reads the data from the optical storage medium 101 in step 201. Then step 203 is executed wherein the data is stored in the buffer 107 temporarily. In step 205, the data is then written into the DRAM 109 from the buffer 107 through the DRAM controller 111. Step 207 is executed to transmit the data from the DRAM 109 through the DRAM controller 111 to the detection element 113 to detect whether an error in the data exists after decoding the data. If no, it means that there is no error detected in the data and step 215 is executed to transmit the data to the host 103. If yes, step 209 is executed in which the data is then transmitted to the error correction element 115 to be corrected. After step 209 is executed, the method goes to step 211 to store a corrected data back to the DRAM 109. Finally, step 213 is executed wherein the corrected data is transmitted to the host 103.

In step 207, the decoding and detecting comprise an error detection code (EDC) check and at least one of a syndrome check and an erasure check to affirm whether an EDC error, a syndrome error, or an erasure error of the data exists.

U.S. Pat. No. 6,003,151 and U.S. Pat. No. 6,662,335 disclose similar systems or methods shown in FIG. 1 and FIG. 2. In both of the two patents, data is stored in a memory through a memory controller first. Then the data is transmitted to be detected whether there is an error in the data. If yes, the data and the error are sent to an error correction element for correct the error. After the correction, the corrected data is transmitted to a host. Based on the above descriptions, people skilled in the art can realize that the memory, i.e., the DRAM 109 is frequently accessed. This occupies lots of the bandwidth of the memory. Besides, if there is no error in the data, the process of decoding is still executed, which influences process speed and wastes power. Especially for BD/DVD/HD-DVD discs, an error rate of data is generally less than 1%. In other words, over 99% of the decoding is unnecessary.

To solve the aforementioned drawbacks, a decoding apparatus which may decrease unnecessary operations and save the bandwidth of memory is required in the industrial field.

SUMMARY OF THE INVENTION

An object of this invention is to provide a decoding apparatus adapted for an optical access system. The decoding apparatus comprises a first memory, an interface, a detection element, and an error correction element. The interface is configured to receive a data from an optical storage medium. The detection element is configured to execute an error detection on the data received from the interface before the data is buffered to the first memory and to generate a defect result in response to the error detection. The error correction element is configured to decode the data if the defect result represents that there is an error detected. The error detection comprises an error detection code (EDC) check and at least one of a syndrome check and an erasure check.

Another object of this invention is to provide a decoding apparatus adapted for an optical access system. The decoding apparatus comprises a first memory, an interface, a detection element, and an error correction element. The interface is configured to receive a data from a Blu-ray disc. The detection element is configured to execute an error detection on the data from the interface before the data is buffered to the first memory and to generate a defect result in response to the error detection. The error correction element is configured to decode the data if the defect result represents that there is an error detected. The error detection comprises at least one of an error detection code (EDC) check, a syndrome check and an erasure check.

Another object of this invention is to provide a decoding method for an optical access system. The decoding method comprises the following steps of: receiving a data from an optical storage medium via an interface of the optical access system; executing an error detection on the data received from the interface before the data is buffered to a first memory; generating a defect result in response to the error detection; and decoding the data if the defect result represents that there is an error detected. The error detection comprises an error detection code (EDC) check and at least one of a syndrome check and an erasure check.

Another object of this invention is to provide a decoding method for an optical access system. The decoding method comprises the steps of: receiving a data from a Blu-ray disc via an interface of the optical access system; executing an error detection on the data from the interface before the data is buffered to a first memory; generating a defect result in response to the error detection; and decoding the data if the defect result represents that there is an error detected. The error detection comprises at least one of an error detection code (EDC) check, a syndrome check and an erasure check.

The present invention determines if there is an error in a data before the data is buffered into a memory. The present invention decodes the data only when there is an error in the data. This invention simplifies the procedure of decoding; therefore, saves the bandwidth of memory and power.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
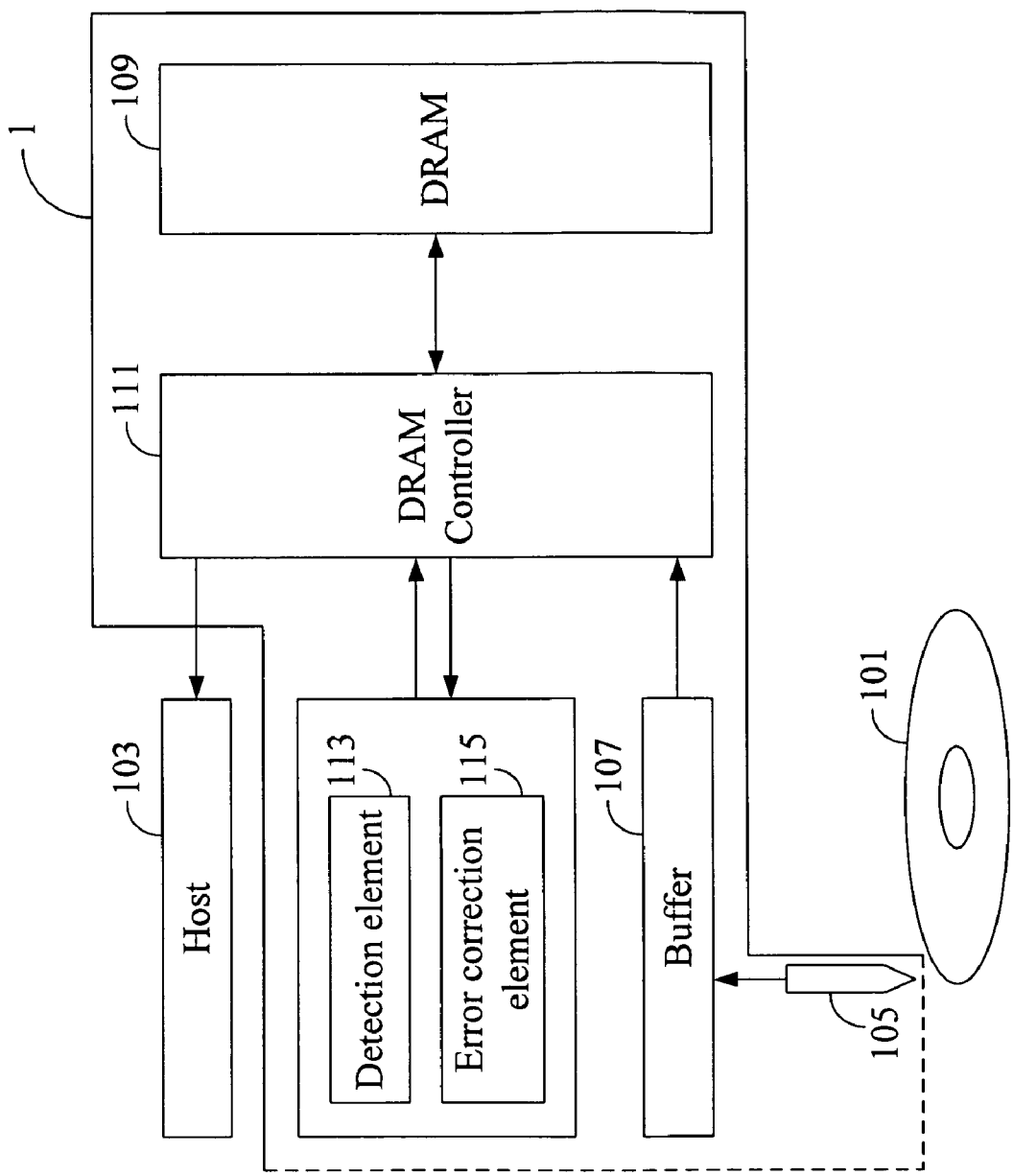
FIG. 1 shows a block diagram of a conventional optical access system.
Figure 2:
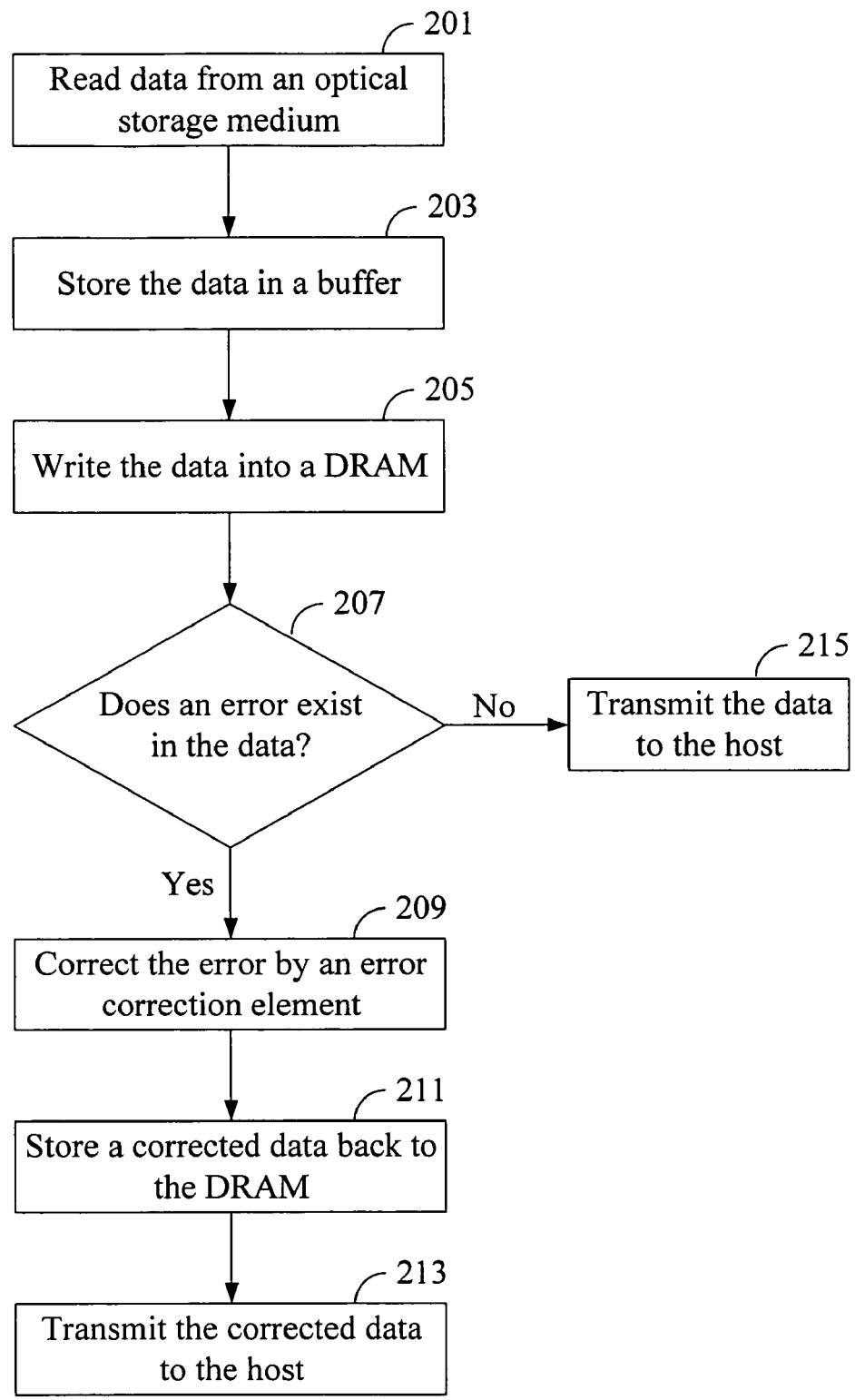
FIG. 2 shows a flow chart of detecting and correcting errors of the prior art.
Figure 3:
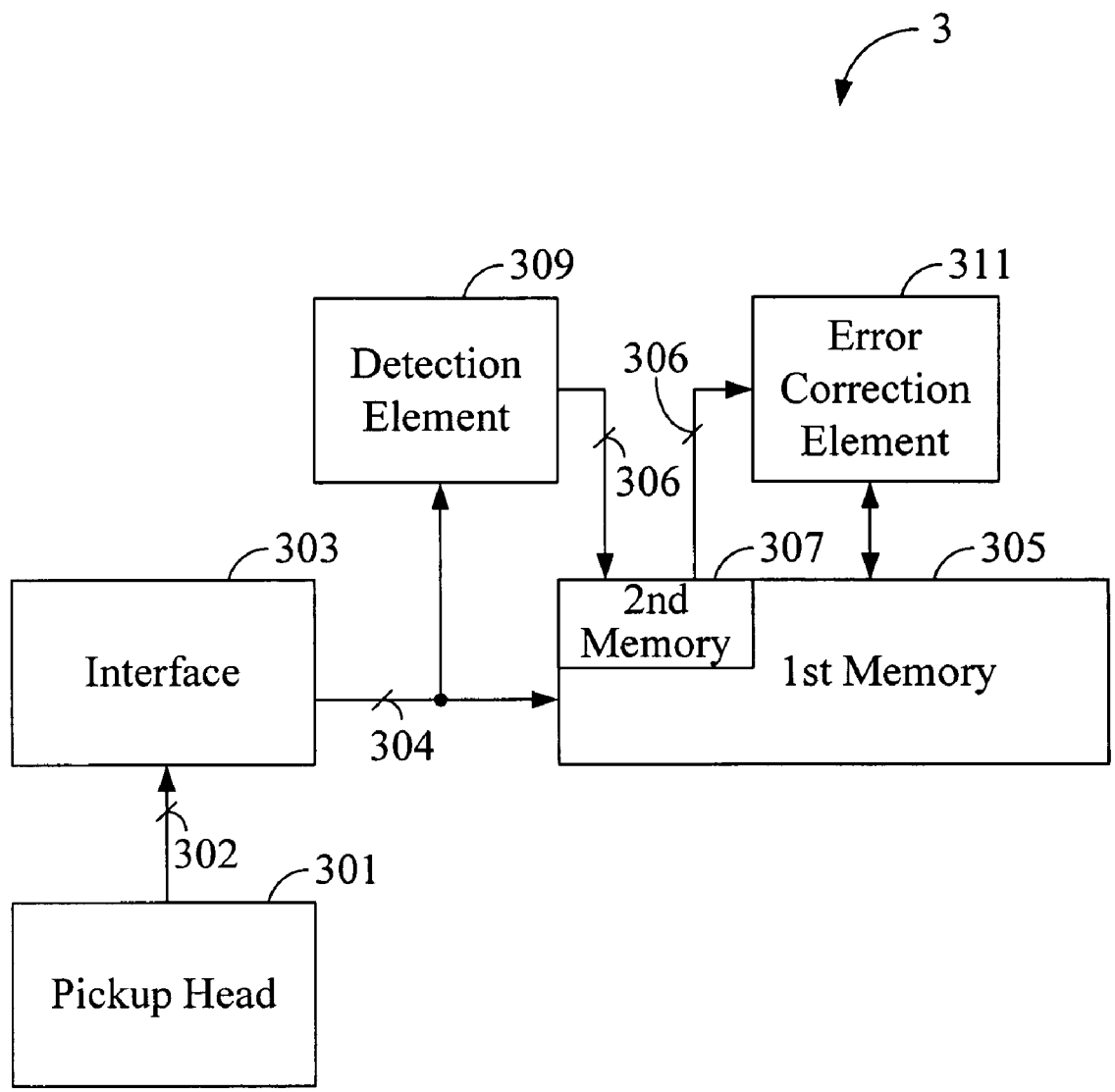
FIG. 3 shows a block diagram of a first embodiment in accordance with the present invention.

A first embodiment of the present invention is a decoding apparatus, adapted for an access storage system, for decoding data effectively. In this embodiment, the optical access system, as illustrated in FIG. 3, may access data on an optical storage medium in a CD format, a DVD format, a Blu-Ray format or a HD-DVD format. The decoding apparatus 3 comprises a pickup head 301, an interface 303, a first memory 305, a second memory 307, a detection element 309, and an error correction element 311. The pickup head 301 is configured to read a data 302 from the optical storage medium (not shown). The interface 303 receives the data 302 through the pickup head 301, and demodulates the data 302. After demodulation, a demodulated data 304 is transmitted to the detection element 309 and buffered to the first memory 305. The detection element 309 executes an error detection on the demodulated data 304 received from the interface 303 before the demodulated data 304 is buffered to the first memory 305. The error detection comprises an error detection code (EDC) check and at least one of a syndrome check and an erasure check to find whether any EDC error, syndrome error, or erasure error exists in the demodulated data 304. Then the detection element 309 generates a defect result 306 in response to the error detection, and stores the defect result 306 in the second memory 307. The error correction element 311 retrieves the defect result 306 from the second memory 307. If the defect result 306 represents that there is an error detected, the error correction element 311 decodes the demodulated data 304. If the defect result 306 indicates that there is no error detected, the error correction element omits the decoding, i.e., an error correction is unnecessary to be run and the error correction element 311 waits for retrieving a next defect result. During the decoding, the error correction element 311 starts the error correction by retrieving the demodulated data 304 from the first memory 305, and decoding the demodulated data 304 in response to the defect result 306 from the second memory 307. The error in the demodulated data 304 is corrected thereby.

In this embodiment, the first memory 305 and the second memory 307 may be one part of a memory respectively, or independent from each other.

Figure 4:
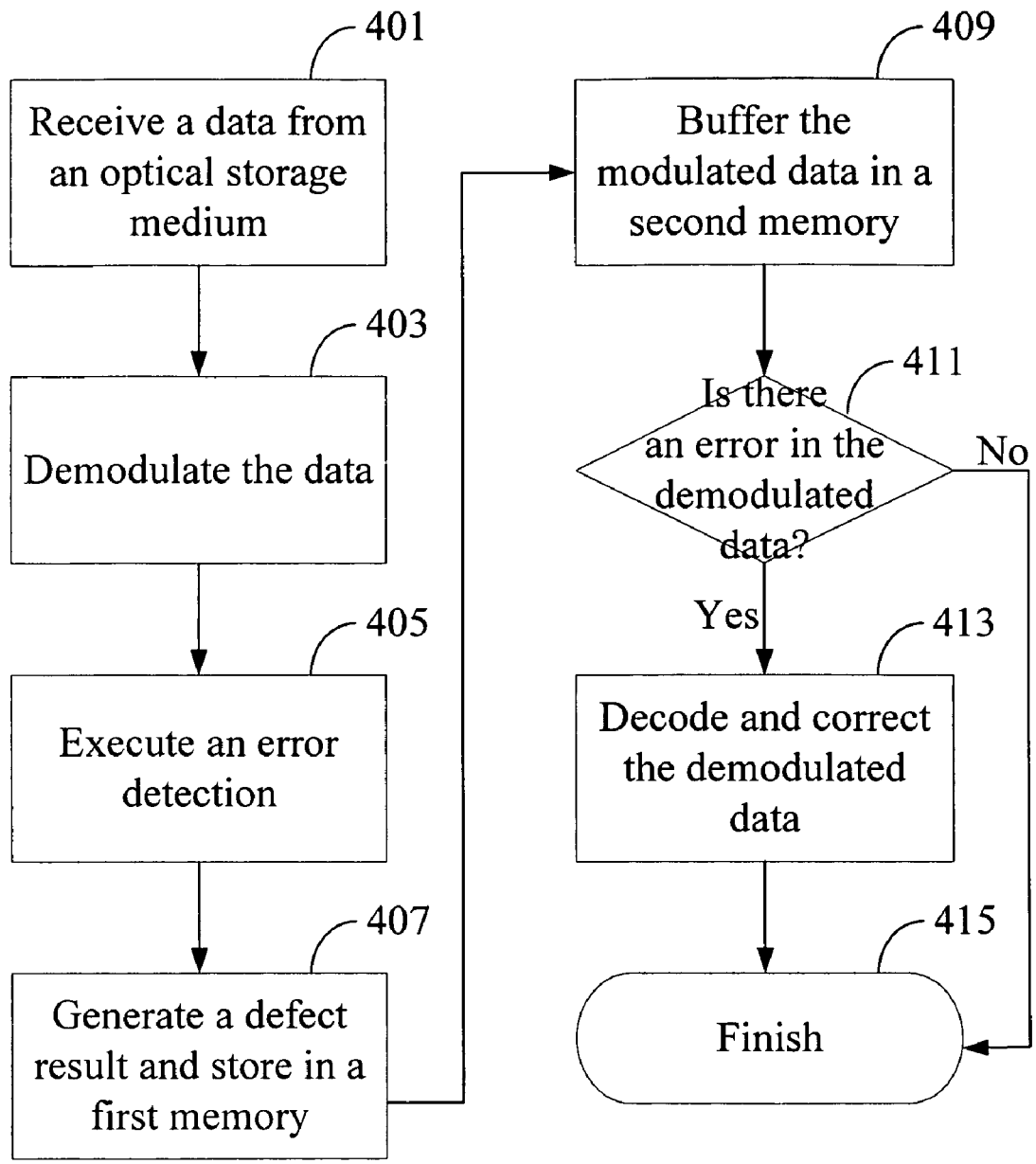
FIG. 4 shows a flow chart of a second embodiment in accordance with the present invention.

A second embodiment of the present invention is a decoding method adapted for an optical access system, such as recited in the first embodiment, which may access data on an optical storage medium in a CD format, a DVD format, a Blu-Ray format or a HD-DVD format. FIG. 4 shows a flow chart of the method. In step 401, receiving a data from an optical storage medium via an interface of the optical access system is executed. In step 403, demodulating the data is executed. After demodulation, step 405 is executed to execute an error detection on the demodulated data received from the interface before the demodulated data is buffered to a first memory. Step 407 is then executed to generate a defect result in response to the error detection, and the defect result is stored in a second memory. After the defect result is generated, the demodulated data is buffered to the first memory in step 409. Step 411 is then executed to determine whether the defect result represents that there is an error detected in the demodulated data. If no, the decoding method omits the decoding and goes to step 415 wherein the method is finished. Otherwise, the decoding method goes to step 413 to decode and correct the demodulated data by retrieving the demodulated data from the second memory. After step 413 is executed, the error in the demodulated data is corrected and the decoding method goes to step 415 wherein the method is finished.

Similar, the error detection in step 405 comprises an EDC check and at least one of a syndrome check and an erasure check to find whether any EDC error, syndrome error, or erasure error exists in the data.

In addition to the steps shown in FIG. 4, the second embodiment is able to execute all of the operations or functions recited in the first embodiment.

Figure 5:
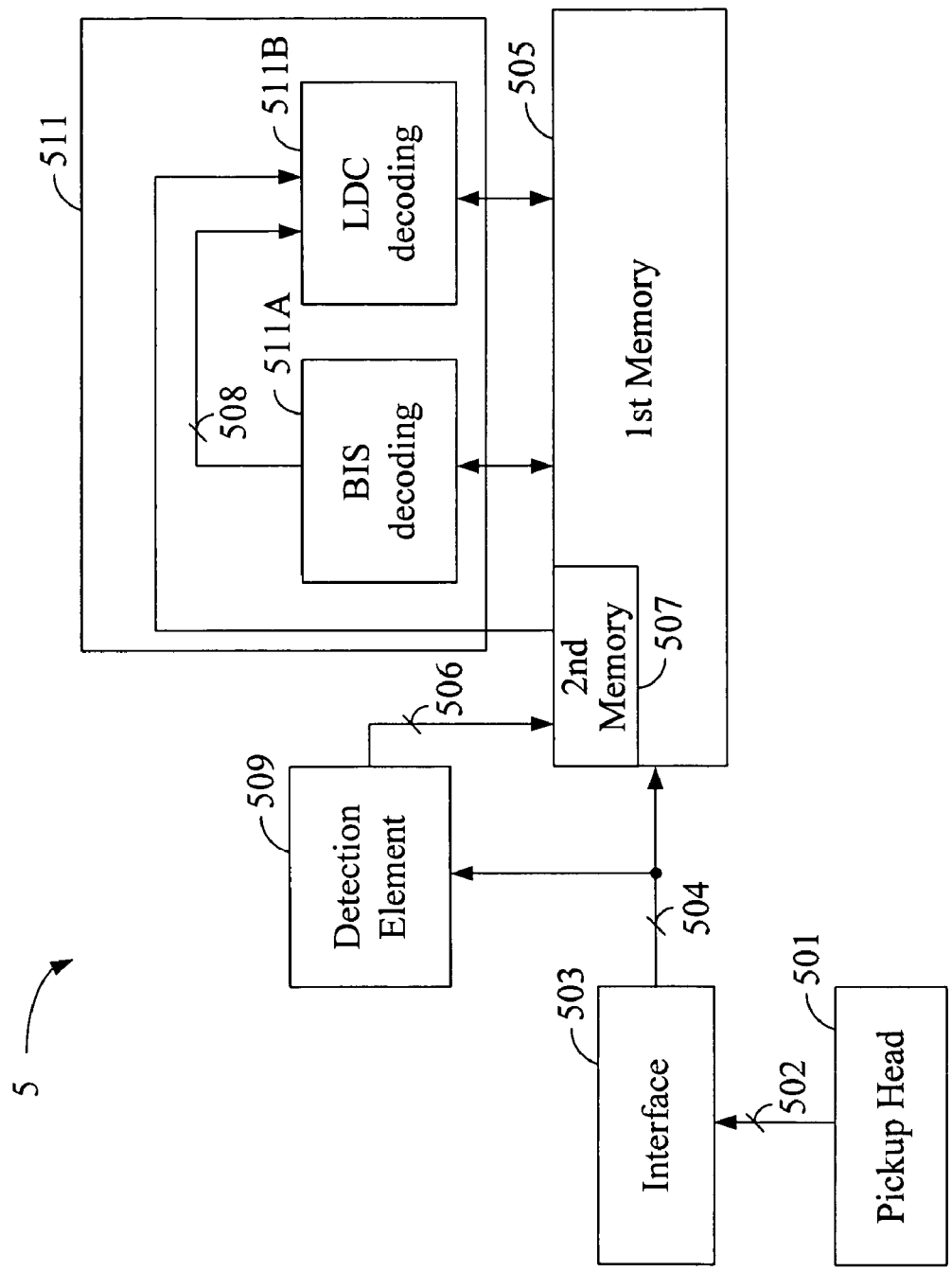
FIG. 5 shows a block diagram of a third embodiment in accordance with the present invention.

A third embodiment of the present invention is a decoding apparatus, adapted for an optical access system, for decoding data effectively. In this embodiment, the optical access system, as illustrated in FIG. 5, may access a data on an optical storage medium in a Blu-ray format, e.g., a Blu-ray disc. The decoding apparatus 5, disposed in the optical access system, comprises a pickup head 501, an interface 503, a first memory 505, a second memory 507, a detection element 509, and an error correction element 511. The pickup head 501 reads data from the Blu-ray disc (not shown). The interface 503 receives the data 502 through the pickup head 501, and demodulates the data 502. After demodulation, a demodulated data 504 is transmitted to the detection element 509 and buffered in the first memory 505. The detection element 509 executes an error detection on the demodulated data 504 received from the interface 503 before the demodulated data 504 is buffered to the first memory 505. The error detection comprises an EDC check and at least one of a burst indicating subcode (BIS) syndrome check, a long distance code (LDC) syndrome check, and an erasure check to find whether any EDC error, BIS error, LDC error, or an erasure error exists in the demodulated data 504. Then the detection element 509 generates a defect result 506 in response to the error detection, and stores the defect result 506 in the second memory 507. The error correction element 511 retrieves the defect result 506 from the second memory 507. If the defect result 506 indicates that there is no error detected, the error correction element 511 executes a simplified decoding procedure to affirm the defect result 506 or omits the decoding directly. If the defect result 506 indicates that there is some error detected, the error correction element 511 starts the error correction by retrieving the demodulated data 504 from the first memory 505, and decoding the demodulated data 504 if the defect result 506 represents that there is an error detected. During the decoding, the error in the demodulated data 504 is corrected.

More particularly, the error correction element 511 comprises a BIS error decoding element 511A and a LDC error decoding element 511B for a Blu-Ray access system. The BIS error decoding element 511A is configured to execute a BIS decoding, i.e., to decode and correct BIS errors in the demodulated data 504. The LDC error decoding element 511B is configured to execute a LDC decoding, i.e., to decode and correct LDC errors in the demodulated data 504. If the detection element 509 detects no error, the BIS error decoding element 511A may be used to affirm the defect result 506. If the BIS error decoding element 511A is not activated when the detection element 509 detects no error, the decoding apparatus 5 treats that no error exists so the error correction is not run. If the BIS error decoding element 511A is activated in such a circumstance, the BIS error decoding element 511A reads demodulated data 504 from first memory 505 and executes the BIS decoding to check if any error can be found. If both of the detection element 509 and the BIS error decoding element 511A find no error, the error correction is unnecessary to be run. If the BIS error decoding element 511A detects at least an error during the BIS decoding, error information 508 would be sent to the LDC error decoding element 511B. Then the LDC error decoding element 511B is activated to execute the LDC decoding to correct the error.

A unit of the LDC decoding may be one of a cluster, a sector, and a syndrome according to the defect result 506 and/or the BIS decoding.

In this embodiment, the first memory 505 and the second memory 507 may be one part of a memory respectively, or independent from each other.

Figure 6:
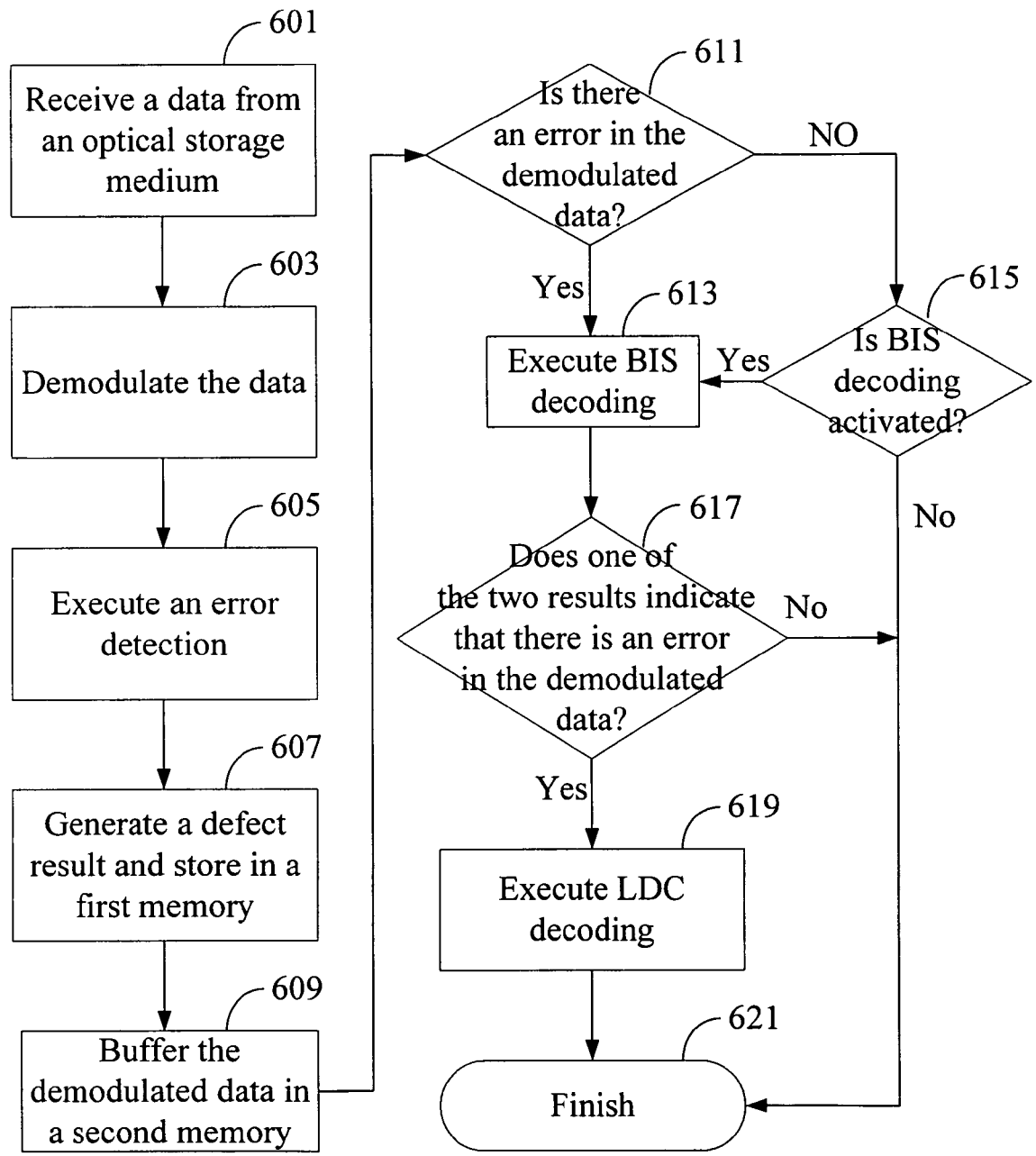
FIG. 6 shows a flow chart of a fourth embodiment in accordance with the present invention.

A fourth embodiment of the present invention is a decoding method adapted for an optical access system, such as recited in the third embodiment, which may access data on an optical storage medium in a Blu-ray format. FIG. 6 shows a flow chart of the method. In step 601, a data is received from the optical storage medium, for example, a Blu-ray disc via an interface of the optical access system. In step 603, demodulating the data is executed. Then step 605 is executed in which an error detection is executed on the demodulated data received from the interface, before the demodulated data is buffered to a first memory, to detect if there is an error in the demodulated data. In particular, the error detection comprises an EDC check, a LDC syndrome check, a BIS syndrome check, a syndrome check, and an erasure check. Then step 607 is executed to generate a defect result in response to the error detection, and the defect result is stored in a second memory. Afterward, the demodulated data is buffered to the first memory in step 609. Then step 611 is executed to determine if the defect result represents that there is an error in the demodulated data. If yes, step 613 is executed to execute BIS decoding to affirm the defect result. Otherwise, step 615 is executed to determine whether the BIS decoding is activated. If no, the decoding method goes to step 621 wherein the method is finished. If yes, step 613 is executed. After step 613 is executed, the decoding method goes to step 617 to check whether one of the BIS decoding and the defect result indicates that there is an error in the demodulated data. If no, the method goes to step 621 wherein the method is finished. Otherwise, the method goes to step 619 wherein LDC decoding is executed by retrieving the demodulated data from the first memory. After the LDC decoding is finished, the demodulated data in the first memory is corrected and the method goes to step 621 wherein the method is finished Similar, the error detection in step 605 comprises an EDC check, a LDC syndrome check, a BIS syndrome check, a syndrome check, and an erasure check to find whether any error exists in the data.

In addition to the steps shown in FIG. 6, the fourth embodiment is able to execute all of the operations or functions recited in the third embodiment.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A decoding apparatus adapted for an optical access system, comprising:
    a first memory;
    an interface for receiving a data from an optical storage medium;
    a detection element for executing an error detection on the data received from the interface before the data is buffered to the first memory and for generating a defect result in response to the error detection; and
    an error correction element for decoding the data if the defect result represents that there is an error detected;
    wherein the error detection comprises an error detection code (EDC) check and at least one of a syndrome check and an erasure check.

2. The decoding apparatus as claimed in claim 1, wherein if the defect result represents that no error is detected in the data, the error correction element omitting the decoding.

3. The decoding apparatus as claimed in claim 1, further comprising:
    a second memory for storing the defect result;
    wherein the error correction element retrieves the data from the first memory and retrieves the defect result from the second memory.

4. The decoding apparatus as claimed in claim 3, wherein the first memory and the second memory are one part of a memory respectively.

5. The decoding apparatus as claimed in claim 3, wherein the first memory is independent from the second memory.

6. The decoding apparatus as claimed in claim 1, further comprising a pickup head for reading the data from the optical storage medium.

7. A decoding apparatus adapted for an optical access system, comprising:
    a first memory;
    an interface for receiving a data from a Blu-ray disc;
    a detection element for executing an error detection on the data from the interface before the data is buffered to the first memory and for generating a defect result in response to the error detection; and
    an error correction element for decoding the data if the defect result represents that there is an error detected;
    wherein the error detection comprises at least one of an error detection code (EDC) check, a syndrome check and an erasure check.

8. The decoding apparatus as claimed in claim 7, wherein the error correction element uses one of burst indicator subcode (BIS) decoding and long distance code (LDC) decoding to decode the data.

9. The decoding apparatus as claimed in claim 8, wherein if the detection element detects no error, the error correction element executes the BIS decoding to affirm the defect result.

10. The decoding apparatus as claimed in claim 9, wherein if the detection element detects no error but the error correction element detects an error during the BIS decoding, the error correction element further executes the LDC decoding to affirm the error.

11. The decoding apparatus as claimed in claim 8, wherein a unit of the LDC decoding is determined to be one of a cluster, a sector, and a syndrome according to one of the defect result and the BIS decoding.

12. A decoding method for an optical access system, comprising:

receiving a data from an optical storage medium via an interface of the optical access system;

executing an error detection on the data received from the interface before the data is buffered to a first memory;

generating a defect result in response to the error detection; and decoding the data if the defect result represents that there is an error detected;

wherein the error detection comprises an error detection code (EDC) check and at least one of a syndrome check and an erasure check.

13. The decoding method as claimed in claim 12, wherein if the defect result represents that no error is detected in the data, the decoding step is omitted.

14. The decoding method as claimed in claim 12, further comprising the step of:

storing the defect result in a second memory;

wherein the decoding step comprises the steps of:
retrieving the data from the first memory; and
retrieving the defect result from the second memory.

15. A decoding method for an optical access system, comprising the steps of:

receiving a data from a Blu-ray disc via an interface of the optical access system;

executing an error detection on the data from the interface before the data is buffered to a first memory;

generating a defect result in response to the error detection; and decoding the data if the defect result represents that there is an error detected;

wherein the error detection comprises at least one of an error detection code (EDC) check, a syndrome check and an erasure check.

16. The decoding method as claimed in claim 15, wherein the decoding step uses one of BIS decoding and LDC decoding to decode the data.

17. The decoding method as claimed in claim 16, wherein if the defect result indicates no error, the decoding step uses the BIS decoding to affirm the defect result.

18. The decoding method as claimed in claim 17, wherein if the defect result indicates no error but the BIS decoding indicates an error, the decoding step further executes the LDC decoding to affirm the error.

19. The decoding method as claimed in claim 16, wherein a unit of the LDC decoding is determined to be one of a cluster, a sector, and a syndrome according to one of the defect result and the BIS decoding.

* * * * *